United States Patent
Mcilvain et al.

(10) Patent No.: US 10,353,455 B2
(45) Date of Patent: *Jul. 16, 2019

(54) POWER MANAGEMENT IN MULTI-CHANNEL 3D STACKED DRAM

(71) Applicant: International Business Machines Corporation, Armonk, NY (US)

(72) Inventors: Kevin M. Mcilvain, Delmar, NY (US); Saravanan Sethuraman, Bangalore (IN); Warren E. Maule, Cedar Park, TX (US); Kyu-hyoun Kim, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/661,003

(22) Filed: Jul. 27, 2017

(65) Prior Publication Data

US 2019/0033949 A1  Jan. 31, 2019

(51) Int. Cl.
*G06F 3/06* (2006.01)
*G06F 1/3203* (2019.01)
*G06F 1/3234* (2019.01)
*G06F 1/3287* (2019.01)
*G06F 9/4401* (2018.01)

(52) U.S. Cl.
CPC .......... *G06F 1/3287* (2013.01); *G06F 1/3203* (2013.01); *G06F 1/3275* (2013.01);
(Continued)

(58) Field of Classification Search
CPC .... G06F 1/3287; G06F 1/3275; G06F 1/3203; G06F 9/4405; G06F 9/442; G06F 3/0659;
(Continued)

(56) References Cited

U.S. PATENT DOCUMENTS 7,581,073 B2   8/2009  Gower et al.
7,908,501 B2   3/2011  Kim et al.
(Continued)

OTHER PUBLICATIONS

Mcilvain et al., "Power Management in Multi-Channel 3D Stacked DRAM", U.S. Appl. No. 15/684,332, filed Aug. 23, 2017, 36 pages.
IBM Appendix P, list of patents and patent applications treated as related, filed herewith, 2 pages.
"128GB 3DS LRDIMM", Skhynix, printed on May 24, 2017, 1 page, <https://www.skhynix.com/eng/popup/prdLRDIMM.sp>.

*Primary Examiner* — Shane D Woolwine
(74) *Attorney, Agent, or Firm* — Edward J. Wixted, III

(57) ABSTRACT

A three-dimensional stacked (3DS) memory module includes multiple memory chips physically integrated with a data I/O chip. The data I/O chip includes multiple data interfaces and multiple respectively corresponding data buffers. A memory controller routes data traffic through all available data interfaces for maximum bandwidth. In some circumstances, the memory controller directs the data I/O chip to de-activate one or more of the data interfaces (for example, to reduce power consumption). All subsequent data traffic to and from the memory module is routed through the remaining active interfaces. All physical addresses in the 3DS memory module are addressable through the remaining active interfaces. In some circumstances, the memory controller directs the data I/O chip to re-activate some or all of the de-activated data interfaces. Once re-activated, subsequent data traffic to and from the memory module can again be routed through all active interfaces.

16 Claims, 9 Drawing Sheets

(52) U.S. Cl.
CPC .......... *G06F 3/0625* (2013.01); *G06F 3/0635* (2013.01); *G06F 9/442* (2013.01); *G06F 9/4405* (2013.01); *G06F 3/0634* (2013.01); *G06F 3/0659* (2013.01); *G06F 3/0683* (2013.01); *G06F 2212/305* (2013.01); *G06F 2212/3042* (2013.01)

(58) Field of Classification Search
CPC ....... G06F 2212/3042; G06F 2212/305; G06F 3/0625; G06F 3/0634; G06F 3/0635; G06F 3/0683
USPC ........................................................ 711/105
See application file for complete search history.

(56) References Cited

U.S. PATENT DOCUMENTS

| | | |
|---|---|---|
| 8,090,968 B2 | 1/2012 | Oh |
| 9,105,323 B2 | 8/2015 | Jeddeloh |
| 9,171,585 B2 | 10/2015 | Rajan et al. |
| 9,229,523 B2 | 1/2016 | Ware et al. |
| 9,298,643 B2 | 3/2016 | Tran et al. |
| 2006/0149492 A1 | 7/2006 | Guidry |
| 2008/0025136 A1 | 1/2008 | Rajan et al. |
| 2008/0126816 A1 | 5/2008 | Prete et al. |
| 2008/0235528 A1 | 9/2008 | Kim et al. |
| 2009/0070612 A1 | 3/2009 | Adelman et al. |
| 2009/0089513 A1 | 4/2009 | Aditham et al. |
| 2014/0192583 A1 | 7/2014 | Rajan et al. |
| 2016/0209911 A1 | 7/2016 | Wagh et al. |

# POWER MANAGEMENT IN MULTI-CHANNEL 3D STACKED DRAM

BACKGROUND

The present invention relates generally to the field of three-dimensional stacked integrated circuits, and more particularly to the field of a power management of a three-dimensional stacked DRAM memory device.

Three-dimensional stacked integrated circuits (3D stacked ICs) comprise two or more IC dies, stacked one on top of the other. Interconnections may be provided by wire-bonding, through-silicon vias (TSVs), and/or interposers. 3D stacked ICs provide higher circuit density, for a given footprint at the next level of assembly (for example a circuit card onto which the 3D stacked IC is mounted).

In high bandwidth data communication, a differential interface minimizes electromagnetic interference. A differential memory interface (DMI) is used to pass data into and out of a memory module with high bandwidth. Information is encoded on an original signal. The original signal is inverted to produce a complementary signal. The original signal is transmitted through one conductor while the complementary signal is transmitted, substantially in phase with the original, though inverted, through another conductor. Both conductors are positioned and routed in close proximity to each other such that external electromagnetic interference (noise) picked up in transmission tends to affect both signals equally (in magnitude and polarity), but has little to no effect on the differential (the difference) between the original signal and the complementary signal. The receiver detects the differential between the original signal and the complement. The amplitude of the differential is substantially double the amplitude of the original signal, thereby doubling the signal to noise ratio. This technique effectively doubles the noise immunity and recovers the transmitted information.

SUMMARY

According to an aspect of the present invention, there is a method, computer program product and/or system that performs the following operations (not necessarily in the following order): (i) receiving a signal, from a requester, commanding shutdown of a first interface of a memory module, where the memory module has a plurality of interfaces including the first interface and a second interface, and a respectively corresponding plurality of data buffers including a first data buffer and a second data buffer; (ii) routing subsequent buffer commands to the second data buffer; (iii) shutting down the first interface; (iv) receiving a signal, from the requester, commanding re-activation of the first interface; (v) initiating a startup procedure to re-activate the first interface; (vi) completing the startup procedure; (vii) responsive to completing the startup procedure, sending a startup procedure completed signal to the requester; and (viii) routing at least some subsequent buffer commands to the first data buffer.

According to a further aspect of the present invention, there is a memory module comprising a plurality of memory devices arranged in a three-dimensional stacked (3DS) configuration, a data I/O chip electrically connected to the plurality of memory devices, where the data I/O chip comprises a plurality of data buffers including a first data buffer and a second data buffer, and a plurality of respectively corresponding interfaces, including a first interface and a second interface, wherein the data I/O chip is configured to perform the following operations (not necessarily in the following order): (i) receiving a signal, from a requester, commanding shutdown of the first interface; (ii) routing subsequent buffer commands to the second data buffer; (iii) shutting down the first interface; (iv) receiving a signal, from the requester, commanding re-activation of the first interface; (v) initiating a startup procedure to re-activate the first interface; (vi) completing the startup procedure; (vii) responsive to completing the startup procedure, sending a startup procedure completed signal to the requester; and (viii) routing at least some subsequent buffer commands to the first data buffer.

DETAILED DESCRIPTION

A three-dimensional stacked (3DS) memory module includes multiple memory chips and a data I/O chip physically integrated into the 3DS memory module. The data I/O chip includes at least two data interfaces and at least two respectively corresponding data buffers. A memory controller routes data traffic through all available data interfaces for maximum bandwidth. In some circumstances, the memory controller directs the data I/O chip to shut down (deactivate) one (or more) of the data interfaces (for example, to reduce power consumption of the memory module). All subsequent data traffic to and from the memory module is routed through the remaining active interface(s). All physical addresses in the 3DS memory module are addressable through the remaining active interface(s). In some circumstances, the memory controller directs the data I/O chip to re-activate the de-activated data interface(s). Once re-activated, subsequent data traffic to and from the memory module can again be routed through all interfaces.

At least some of the embodiments disclosed herein recognize that memory input/output (I/O) speeds are increasing. Emerging standards (for example DDR5), including two-channel dual inline memory modules (DIMM) bring a need for improved signal integrity, more efficient power utilization, improved reliability, availability, and serviceability, improved bandwidth, improved memory access, better debug and characterization, improved area utilization, and improved thermal management.

The present invention will now be described in detail with reference to the Figures.

Figure 1A:
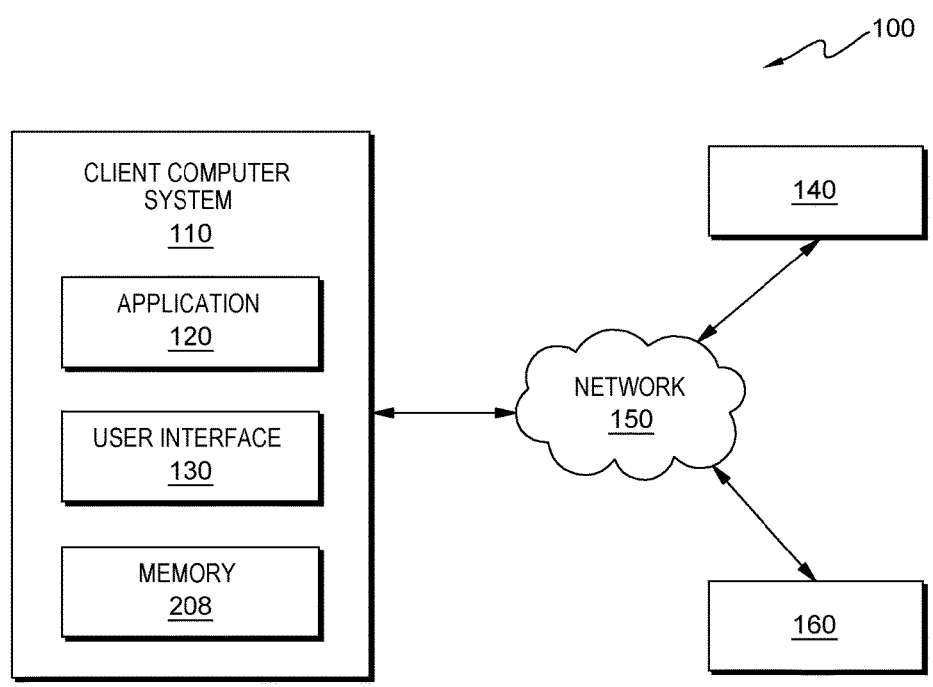
FIG. 1A is a block diagram depicting a computer system according to at least one embodiment of the present invention.

FIG. 1A is a functional block diagram depicting a computing environment 100 in accordance with an embodiment of the present invention. Computing environment 100 includes client computer systems 110, 140 and 160. Client computer system 110 can be any of a desktop computer, a laptop computer, a specialized computer server, or any other computer system known in the art. In some embodiments, client computer system 110 represents a computer system utilizing clustered computers and components to act as a single pool of seamless resources when accessed through network 150. In general, client computer system 110 is representative of any electronic device, or combination of electronic devices, capable of executing machine-readable program instructions, as described in greater detail with regard to FIG. 8.

Figure 1B:
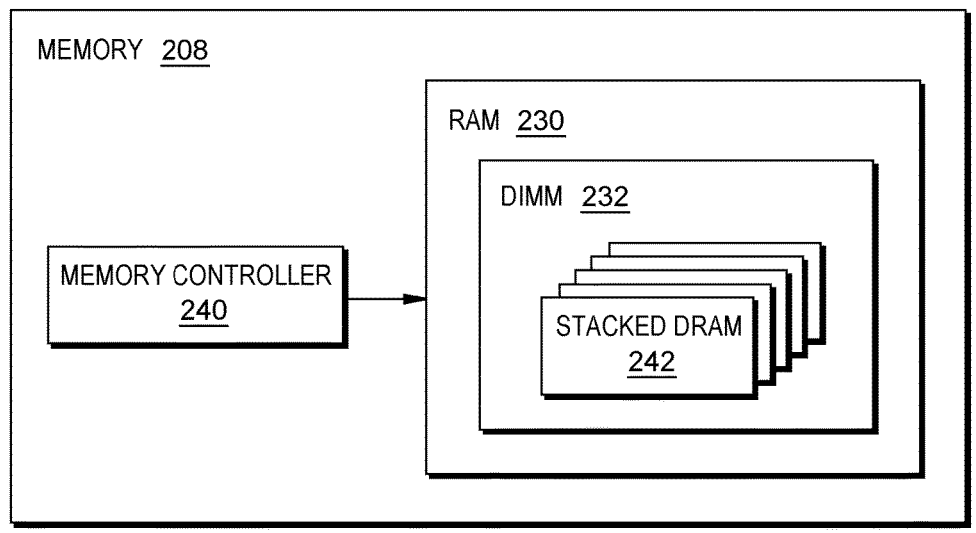
FIG. 1B is a block diagram depicting a memory portion of a computer system according to at least one embodiment of the present invention.

FIG. 1B is a block diagram depicting a memory 208 portion of client computer system 110. Memory 208 includes memory controller 240, random access memory (RAM) 230, and stacked dynamic random access memory (DRAM) 242.

Figure 1C:
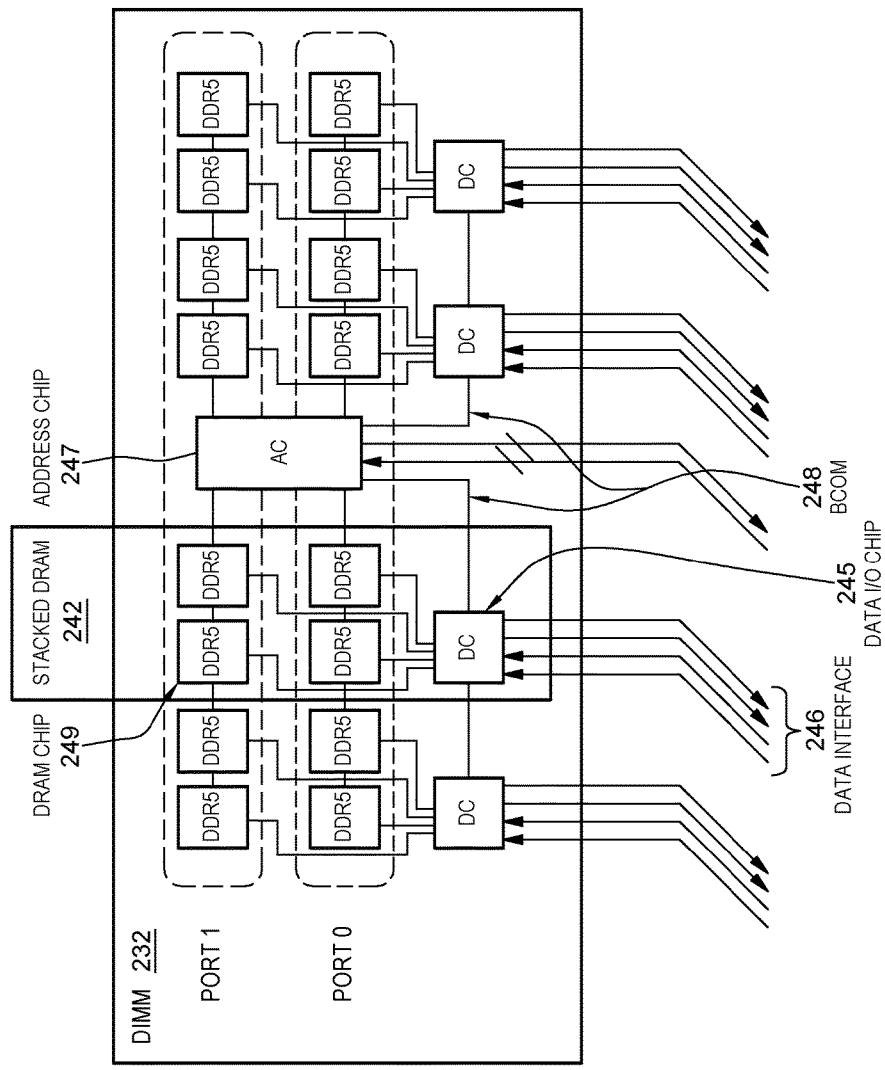
FIG. 1C is a block diagram depicting a high speed differential based dual inline memory module (DIMM) according to at least one embodiment of the present invention.

FIG. 1C is a functional block diagram showing at least a portion of DIMM 232, which is a high speed differential based dual inline memory module (DIMM) with distributed data buffers (referred to as a DB DIMM). DIMM 232 includes: stacked dynamic random access memory (stacked DRAM 242); data I/O chip 245 (comprises two or more data buffers); data interface 246, (which can be one of: (i) a differential memory interface (DMI) link; (ii) a single data rate (SDR) link; (iii) a double data rate (DDR) link; (iv) a quad data rate (QDR) link; and/or (v) any other type of data link now known or to be developed in the future); address chip 247; buffer command interface (BCOM 248); and DRAM chip 249.

Figure 2:
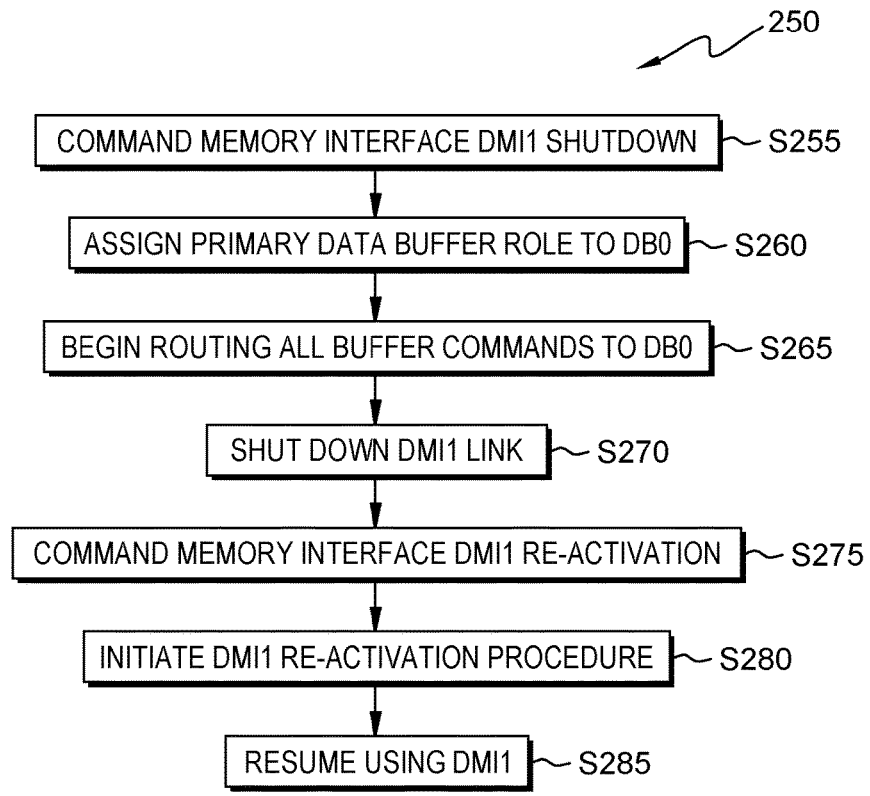
FIG. 2 is a flowchart depicting a method performed, at least in part, according to at least one embodiment of the present invention.
Figure 3:
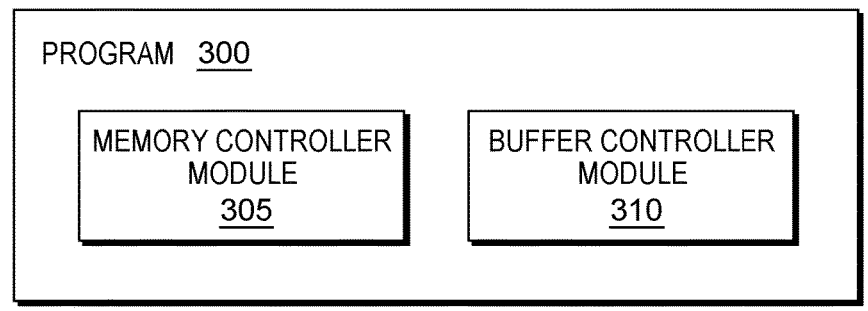
FIG. 3 is a block diagram depicting a machine logic (for example, software) according to at least one embodiment of the present invention.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where memory controller module 305 sends a signal to buffer control module 310, commanding a memory interface shutdown. In this present embodiment, the memory controller wants to shut down differential memory interface DMI1 in a memory module that has two DMI interfaces (DMI0 and DMI1). Alternatively, in some embodiments, the command may be to shut down a DDR interface in a memory that has two or more DDR interfaces.

Processing proceeds at operation S260, where buffer control module 310 assigns data buffer DB0 to take on the role of a primary data buffer. Data buffer 1 (DB1), which buffers DMI1, the interface that is to be shut down, takes on the role of a secondary data buffer, that is it becomes inactive, at least for some length time.

Processing proceeds at operation S265 where memory controller begins routing all buffer commands to the primary data buffer, meaning in the present embodiment, data buffer 0 (DB0).

Processing proceeds at operation S270, where the secondary data buffer (DB1) shuts down DMI1.

Processing proceeds at operation S275, where memory controller module 305 sends a signal (over a DMI/sideband/BCOM, for example from a registered clock driver (RCD) or an address chip (AC), etc.) to buffer control module 310 commanding DMI1 re-activation. (The address chip buffers command and address signals to a DRAM device.)

Processing proceeds at operation S280, where secondary data buffer DB1 initiates a startup procedure to re-activate the DMI1 link. On completion of the startup procedure, active data buffer (DB0) receives a signal indicating the completion.

Processing proceeds at operation S285, where data buffer DB0 sends a response to the memory controller indicating DMI1 is active, whereupon the memory controller resumes using both lanes (DMI0 and DMI1).

Some embodiments of the present invention may include one, or more, of the following features, characteristics and/or advantages: (i) better signal integrity; (ii) more efficient power utilization; (iii) better reliability, availability, and serviceability; (iv) improved bandwidth; (v) improved memory access; (vi) better debug and characterization; (vii) better area utilization; and (viii) considerations for better thermal management.

Some embodiments of the present invention adapt a high level architecture for a 3D stacked memory device for use in various memory technologies including for example: (i) high speed differential based dual inline memory module with distributed data buffers (DB DIMM); (ii) high speed serial channel based memory interface to accommodate faster, high density, low latency dynamic random access memory (DRAM); and (iii) modifications to the Joint Electron Device Engineering Council (JEDEC) standard DIMM module for DDR5 memory. In some embodiments of the present invention, multiple data buffers are incorporated at the base of the 3D Stack to create: (i) a configurable number of memory channels and primary ranks; or (ii) a single channel with a reduced physical area.

Some embodiments of the present invention may include one, or more, of the following features, characteristics and/or advantages: (i) improved signal integrity; (ii) more efficient use of memory bandwidth; (iii) improved reliability, availability and serviceability (RAS); (iv) improved characterization and debug of the host interface; and/or (v) reduced DIMM physical size.

Some embodiments of the present invention manage the differential interface to a multi-channel memory device with an emphasis on power management. In some embodiments of the present invention, there exist multiple differential data buffers which communicate with the device in the stack. In normal operational modes the data buffers would be configured to maintain the highest number of active channels capable for the device. In a power savings mode, one or more differential memory interface(s) (DMI) are shut down and all DMI activity is routed through one or more remaining active data buffers thus reducing overall power usage. Communications between data buffers is similar to a conventional BCOM interface. Each data buffer can be configured as a primary or a secondary data buffer (also sometimes herein respectively referred to as active and standby data buffers). The BCOM interface (buffer command interface) is, in some embodiments, a one way communication bus from a registered clock driver (RCD) to the data buffers on a load reduced DIMM (LRDIMM). In some embodiments, the RCD is an address chip (AC).

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

In some embodiments of the present invention, the foregoing method is used to: (i) enhance reliability, availability, and/or serviceability (RAS); (ii) provide workaround in case of a DMI failure, etc.; and/or (iii) for conducting diagnostics while the system remains operational. Some embodiments of the present invention are applied for any number of high stack configurations such as 8 (1R) or 16 (2R) configurations. Further, the same architecture can be applied when the DMI is in power reduction mode (where only half the number of DMI lanes are active) and the other (shut down) DMI lanes can be brought up back online as needed to meet increased bandwidth demands. Thus, power consumed by the memory stack is dynamically trimmed back or increased as necessary to handle fluctuating bandwidth demands.

Some embodiments of the present invention a may include one, or more, of the following features, characteristics and/or advantages: (i) improved signal integrity; (ii) improved power utilization efficiency; (iii) improved reliability, availability, serviceability (RAS); (iv) improved bandwidth capability; (v) improved memory access; (vi) improved debug and characterization; (vii) improved chip area utilization; (viii) improved thermal management.

Figure 4:
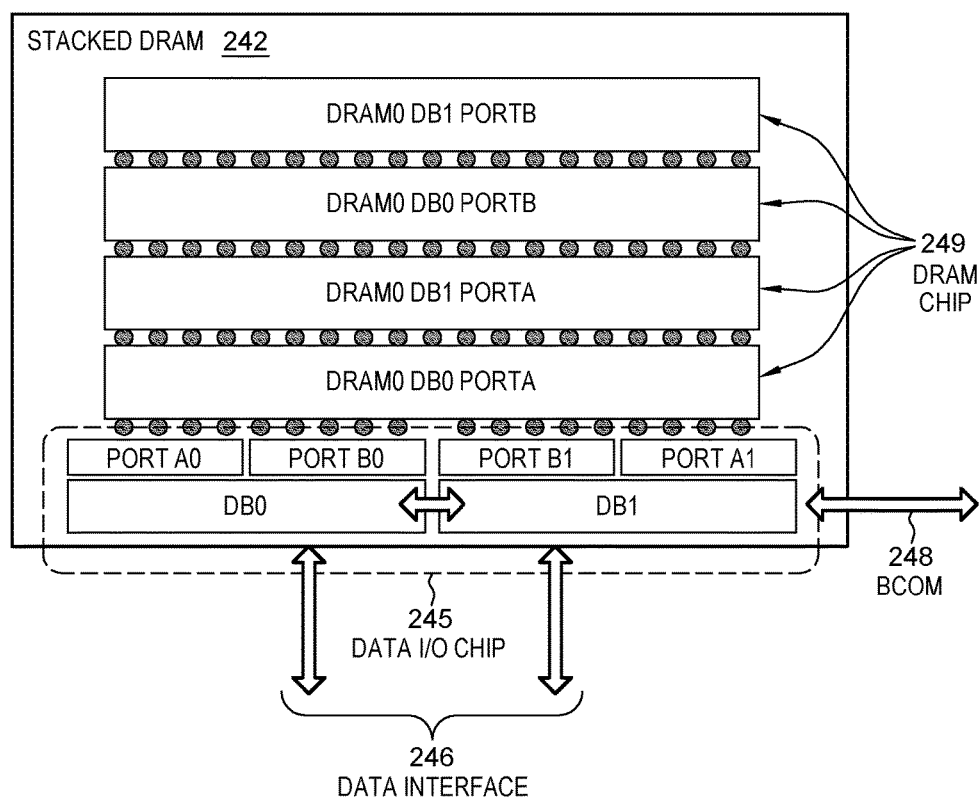
FIG. 4 is a block diagram depicting a stacked DRAM configuration according to at least one embodiment of the present invention.

As shown in FIG. 4, stacked DRAM 242 is a basic, multi-channel 4H stack (one DRAM per channel) in accordance with some embodiments of the present invention. In this embodiment, data I/O chip 245 comprises data buffers DB0 and DB1. Each data buffer (DB0 and DB1) comprises two ports (respectively A0/B0 and A1/B1). Data I/O chip 245 buffers data and data strobe signals to the DRAM chips. Data buffer 0 (DB0) and data buffer 1 (DB1) are configured as different primary ranks, which affords data access flexibility and full bandwidth operation. DB0 and DB1 are configured on the same rank, or on different channels.

Note: The order in which the DRAM chips are stacked is not limited to the order shown in FIGS. 4, 5, 6A, 6B, and 7.

Some embodiments of the present invention activate (power on) only one data buffer (for example, DB0) and hold a second data buffer (DB1) as a spare. In this configuration, the stack is in a power saving mode. If the active data buffer (DB0) fails, the spare becomes active and takes control. In some embodiments of the present invention, this configuration is used when the differential memory interface is not able to support 4:1 mode.

Data communications among and between the stacked DRAMs, data buffers, ports and other components may be made with any one of, or any combination of electrical interconnections (wirebonds, through silicon vias (TSVs), interposers, etc.), or any other type of connection, now known or to be developed in the future, including for example, wireless and optical means of data communication.

In some embodiments of the present invention, data buffers DB0 and DB1 are connected through the die, and may provide one, or more, of the following features, characteristics and/or advantages (i) loopback capability; (ii) enhanced RAS capability; (iii) reduced power modes; and/or (iv) more memory access options. Each of these features, characteristics and/or advantages will be discussed in the following few paragraphs.

Loopback capability: For example, a command sent from host to the receiver (RX) on DB0 can be relayed to the transmitter (TX) on DB1 and sent back to the host. This may help to characterize DFE circuits for DDR5 buffers and can be used as a loopback for differential interface testing for differential buffers.

Ras capability: If a host side interface fails on data buffer DB0, for example, some embodiments of the present invention route traffic through the other buffer (DB1) to access data behind DB0, thereby avoiding an impact to reliability, availability and/or serviceability that may otherwise have resulted from the failed host side interface failure.

Reduced power modes: Some embodiments of the present invention shut down single buffers, for example DB0, to reduce power while maintaining a link through the other buffer (for example, DB1).

More memory access options: When multiple data buffers, for example DB0 and DB1 (in some embodiments, there are more data buffers, for example DB0 through DB3), are configured as different channels in the stack, the host can access certain dies in the stack through any channel. In some embodiments, this is achieved in conjunction with slight modifications to the registered clock driver (RCD). The memory controller (MC) sends the same chip select (CS) to the data buffer (DB0 or DB1, for example). The MC sends the buffer command (BCOM) which includes the chip ID to which the BCOM is directed. In an 8 high stack, for example, each channel is configured for 8 high, and the RCD and/or MC ensures there are no collisions.

There are various architecture options provided in some embodiments of the present including options to have: (i) DB0 and DB1 configured as different primary ranks; (ii) DB0 and DB1 configured as different channels; and (iii) DB0 and DB1 configured as the same rank and the same channel. These options are discussed in the following few paragraphs below.

DB0 and DB1 configured as different primary ranks: In this configuration, the memory controller can dynamically access dies assigned to different ranks. While conventionally, a given die is assigned to a primary rank, in some embodiments of the present invention, there are configured multiple primary ranks. This helps to put a configurable number of primary and secondary data buffers into self-timed refresh (STR). For example, in one embodiment, an 8H stack is configured with two primary ranks. In this embodiment, multiplexing is required for chip select (CS). In another embodiment, two dies are assigned to one rank, and six dies are assigned to the other rank. In yet a third embodiment, the ranks are interleaved and one rank is put into self-timed refresh (STR) mode to help with thermal management.

DB1 configured as different channels: In this configuration, a DDR5 DIMM has the same number of channels as in a conventional memory module, but in a smaller module size. This configuration provides access to the same data across two channels. This works well, for example, for two high priority full page reads to the same channel. The DRAMs are quickly accessed through two channels, and enhances RAS capabilities and increases debug and characterization (CZ) capabilities.

DB0 and DB1 configured as same rank, same channel: Compared to conventional DIMM configurations, this configuration uses less space on the DIMM, has enhanced RAS capabilities and increases debug and CZ capabilities.

Figure 5:
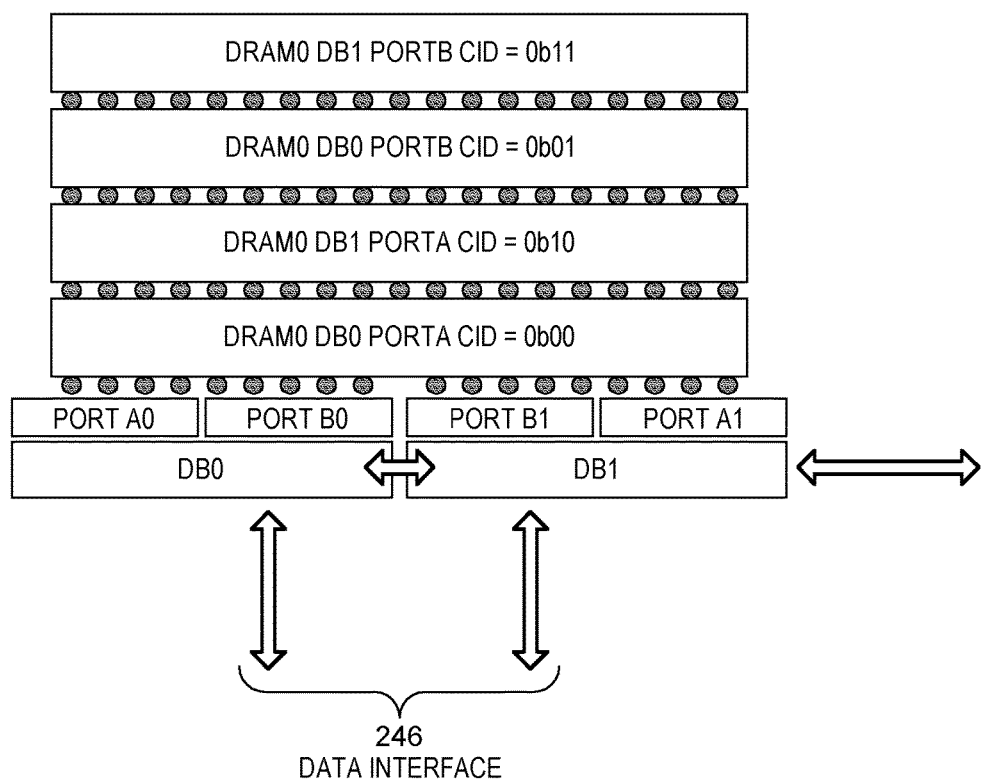
FIG. 5 is a block diagram depicting a stacked DRAM configuration according to at least one embodiment of the present invention.

FIG. 5 is a diagram showing a basic 4H stack in accordance with at least one embodiment of the present invention. Data buffers DB0 and DB1 are configured as different channels (channel-0 and channel-1). Channel 0 comprises the following components: DB0; ports A0 and B0; chips 0b00 and 0b01; and the interconnections among the aforesaid components. Channel 1 comprises the following components: DB1; ports A1 and B1; chips 0b10 and 0b11; and the interconnections among the aforesaid components. The order in which the DRAM chips are stacked, in some embodiments of the present invention, is not limited to the order shown in FIG. 5.

Data communications among and between the stacked DRAMs, data buffers and ports may be made with any one of, or any combination of electrical interconnections (wire-bonds, through silicon vias (TSVs), interposers, etc.), or any other type of connection, now known or to be developed in the future, including for example, wireless and optical means of data communication.

In the embodiment of FIG. 5, each channel is configured as 4H. In normal operation, each channel accesses two dies. For example, channel-0 accesses dies 0b00 and 0b01, and channel-1 accesses dies 0b10 and 0b11.

For a case where a two large high priority (HP) reads hit channel 0 (one read for die 0b00 and one read for die 0b01), only one read can be serviced at a time. For example, assume channel 0 handles the read for die 0b00. If Channel 1 has lower priority activity, the second HP read for channel 0 (for die 0b01) can be serviced on channel 1 by granting permission to channel 1 to access the die 0b01 through the channel 1 data buffer. In some embodiments, a data buffer's permission to access a die behind another data buffer is managed by locking the chip IDs (CIDs). The CID acts as a chip select (CS signal) that will select which die in the stack will be accessed by a buffer command. In this scenario each data buffer would have access to the dies behind the other data buffer for a total of four rather than just two. However for typical operation each buffer would only access the two devices it is directly connected to.

In certain cases where a first channel is busy with a HP transaction, a second HP transaction directed to an idle die on the first channel is routed through a second channel. The data buffer on the second channel first takes ownership of the idle die on the first channel by setting a bit in the first buffer to block transactions to the idle die. The second HP transaction is routed through the second channel and is directed through the second data buffer to access the idle die.

Power Management Example for a Differential Interface

Some embodiments of the present invention can operate in normal operational modes and/or in power saving modes. These modes are discussed in the following few paragraphs.

Normal operational modes: Operating in normal modes, the data buffers are configured to maintain the greatest number of active channels that the device is capable of supporting.

Power savings modes: In a power savings mode, one differential interface is shut down and all DMI activity is routed through one data buffer (or a combination of transmit (TX) and receive (RX) among multiple buffers), thus reducing power usage. Communication between data buffers is similar to a normal buffer command (BCOM) interface. Each data buffer can be configured as either a primary or secondary buffer, or configured as a split wherein TX is routed to one buffer and RX is routed to the other.

In some embodiments of the present invention, DMI interface shutdown is accomplished as follows: (i) memory controller 240 of memory 208 (see FIG. 1B) of client computer system 110 (see FIG. 1A) sends a DMI interface shutdown signal (not shown in the figures) to the memory module, RAM 230. In response to receiving the signal, DB0 (in the embodiment of FIG. 6A) assumes the role of primary data buffer and the other data buffer (DB1) assumes a role of secondary data buffer. Primary data buffer DB0 becomes ready to route commands. Memory controller 240 (FIG. 1B) begins sending all commands to the primary data buffer DB0. Secondary data buffer DB1 shuts down DMI link 1.

When the memory controller (MC) is ready to restore operation to DMI link 1, some embodiments of the present invention perform the following procedure: (i) the MC sends a signal to the primary data buffer (over a DMI/sideband/BCOM, from a registered clock driver (RCD) or address chip (AC chip), etc.) requesting that DMI link 1 be made operational again; (ii) the secondary data buffer starts a DMI link bring up procedure; (iii) after the DMI link 1 is ready, the primary data buffer sends a DMI link bring up completion response to the MC; and (iv) MC begins to use both lanes again.

The foregoing method can be used: (i) to maintain prescribed reliability, availability, serviceability (RAS) levels, for example, in case of a DMI failure; and/or (ii) for diagnostics while the system is operational, etc.

Some embodiments of the present invention can be applied for any number of high stacks such as 8 (1R) or 16 (2R). Further, the same architecture can be used when the DMI is in power reduction mode (where only a fraction (for example half) of the DMI lanes are active). Lanes can be shut down and/or brought back online based thermal considerations, bandwidth requirements or on demand.

Figure 6A:
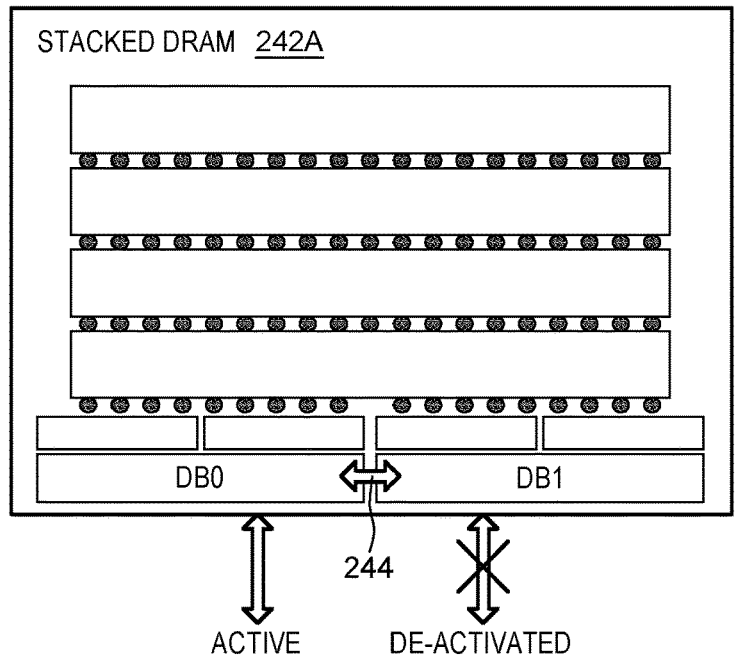
FIG. 6A is a block diagram depicting a stacked DRAM configuration according to at least one embodiment of the present invention.
Figure 6B:
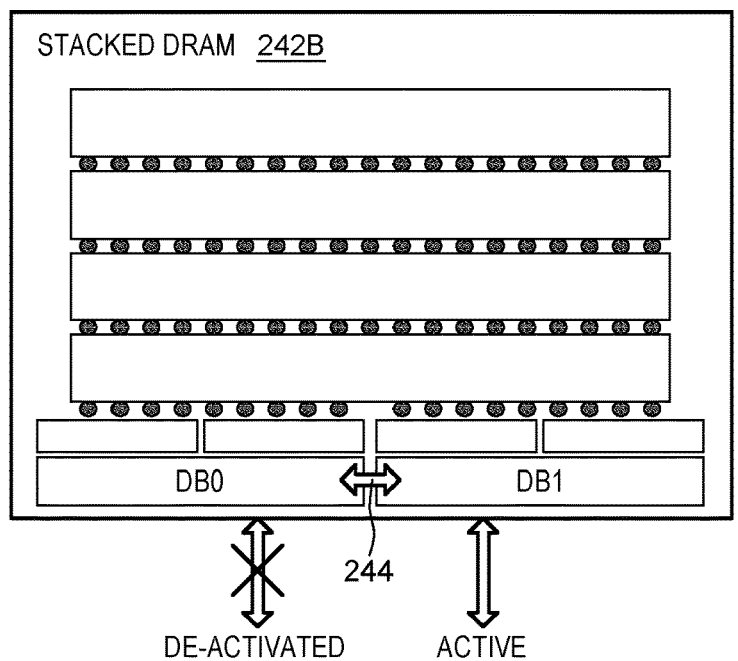
FIG. 6B is a block diagram depicting a stacked DRAM configuration according to at least one embodiment of the present invention.

FIGS. 6A and 6B show multi-channel 4H stacks in some embodiments of the present invention, operating at half bandwidth capacity, with one DRAM per channel. Stacked DRAM 242A of FIG. 6A, as shown, operates with data buffer 0 active and data buffer 1 de-activated. Memory controller (not shown) communicates with stacked DRAM 242A through differential memory interface 0 (DMI0). In contrast, stacked DRAM 242B of FIG. 6B, as shown, operates with data buffer 0 de-activated and data buffer 1 active. Memory controller (not shown) communicates with stacked DRAM 242B through differential memory interface 1 (DMI1). In the embodiments of stacked DRAM 242A and stacked DRAM 242B, data buffers DB0 and DB1 may communicate directly with one another via inter-data-buffer communication link 244.

Some embodiments of the present invention may include one, or more, of the following features, characteristics and/or advantages: (i) has at least dual (two or more) channels on one 3-dimensional, stacked memory ("3DS" or "3D stack"); (ii) has high speed serial (HSS) link to the DRAMs (to handle future speed and bandwidth requirements); (iii) places differential data buffers on the 3DS stack; (iv) by using a 3DS memory stack with built in differential memory buffers, each device in the stack can act as a device on a different channel; (v) allows for higher memory bandwidth with a lower footprint than conventional 3DS DRAM stacks; (vi) data buffers can be connected such that if one fails, data can still be accessed; (vii) compatible with certain wiring (for example, chip select (CS) wiring and clock enable (CKE) wiring, etc.); (viii) can achieve dual drop DIMM configuration (for example with 16H stack configuration); (ix) ability to virtually rearrange memory space configuration of a DRAM device.

With regard to item (ix) in the paragraph above, ability to virtually rearrange memory space configuration allows a DRAM device to dynamically remap the DRAM die to a different channel to maximize bandwidth. In some embodiments, tag information is sent back with response data, allowing data to be returned through any data buffer channel. The controller gathers the data based on the responses. This works well with any protocol a customer chooses.

Some embodiments of the present invention may include one, or more, of the following features, characteristics and/or advantages: (i) reduces amount of physical real estate per unit of memory; (ii) reduces buffer command interface (BCOM) cost especially in case of dual drop; (iii) reduces input/output (I/O) electrical current requirement and therefore power consumption; (iv) improves signal integrity; (v) vertically increases the density in lesser space (smaller footprint per unit memory); (vi) provides opportunity to create new RAS features for the same architecture; and/or (vii) facilitates control of thermal behavior by interleaving between ports.

In some embodiments of the present invention, by using a 3DS memory stack with built-in differential memory buffers, each device in the stack can act as a device on a different channel. This allows for higher memory bandwidth with a lower physical footprint than conventional 3DS DRAM stacks. In some embodiments, data buffers are connected, and data access is maintained, in a case for example where one data buffer fails. Some wiring (for example chip select and clock enable wiring, etc.) in some embodiments of the present invention, is compatible with conventional designs.

In some embodiments of the present invention, dual drop DIMM configurations are achieved with 16H stack configuration.

Some embodiments of the present invention provide the ability to virtually rearrange memory space configuration of a DRAM device, which allows dynamic remapping the DRAM die to a different channel to maximize bandwidth. Tag information is sent back with the response data, to allow data to be returned through any data buffer channel. The memory controller properly gathers the data based on the responses. This method is suitable for use in any protocol.

Figure 7:
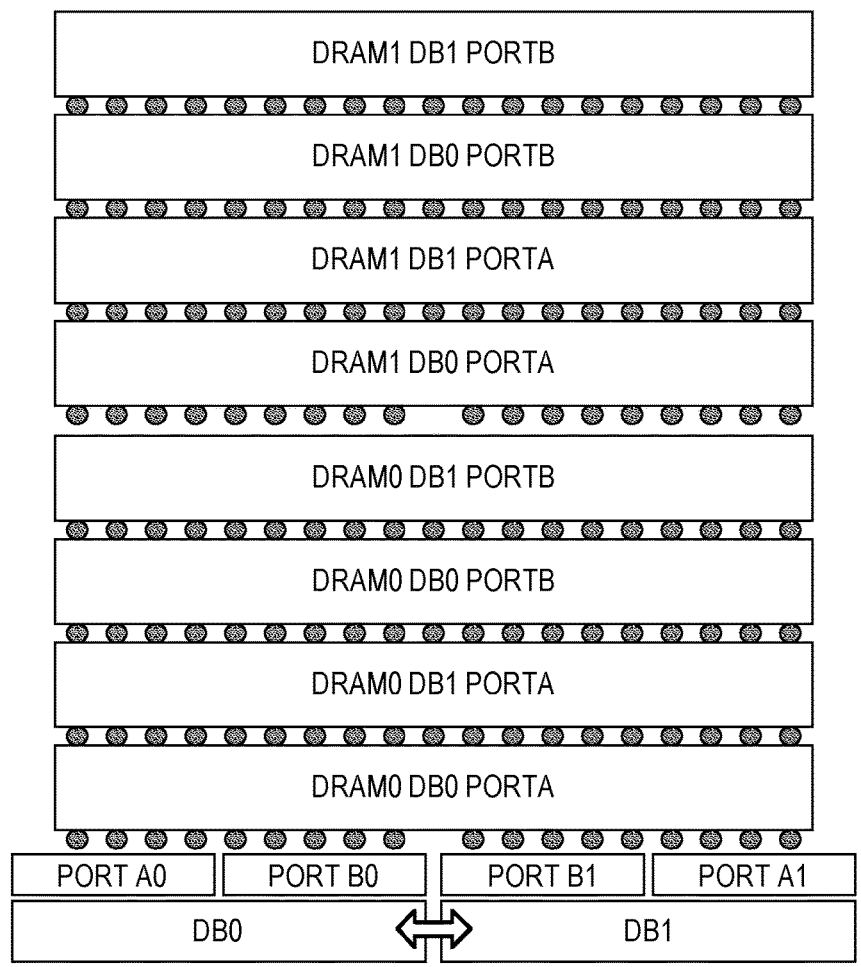
FIG. 7 is a block diagram depicting a stacked DRAM configuration according to at least one embodiment of the present invention.

FIG. 7 shows a multi-channel 8H stack having two DRAMs per channel. In the embodiment of FIG. 7, channel 0 includes the following components: data buffer DB0; ports A0 and B0; DRAM chips DRAM0 DB0 PORTA, DRAM0 DB0 PORTB, DRAM1 DB0 PORTA, and DRAM1 DB0 PORTB; and the interconnections among the aforementioned components. Channel 1 includes the following components: data buffer DB1; ports A1 and B1; DRAM chips DRAM0 DB1 PORTA, DRAM0 DB1 PORTB, DRAM1 DB1 PORTA, and DRAM1 DB1 PORTB; and the interconnections among the aforementioned components. The order in which the DRAM chips are stacked, in some embodiments of the present invention, is not limited to the order shown in FIG. 7.

An 8H stack is the default configuration, and supports 1R. A 16H stack supports 2R.

Interconnections among the stacked chips can be made with any one of, or any combination of electrical interconnections (wirebonds, through silicon vias (TSVs), interposers, etc.), or any other type of connection, now known or to be developed in the future, including for example, inductive coupling, wireless and optical means of data communication.

Some embodiments of the present invention configure each data buffer of a memory module as an active data buffer or a standby data buffer (also sometimes herein respectively referred to as primary and secondary data buffers). Some embodiments of the present invention send all signals from the memory controller (MC) to an active data buffer while a standby data buffer shuts down a corresponding data link. This configuration reduces the power consumed by the memory module. If the MC wants to re-activate the data link that has been shut down, the MC sends a "re-activate data link" signal to the active data buffer, which in turn, triggers the standby data buffer re-activate the data link, and reconfigure the standby data buffer as an active data buffer. In some embodiments of the present invention, the data links comprise one or more of: (i) a differential memory interface (DMI) link; (ii) a single data rate (SDR) link; (iii) a double data rate (DDR) link; (iv) a quad data rate (QDR) link; and/or (v) any other type of data link now known or to be developed in the future.

Some embodiments of the present invention manage a differential interface to a multi-channel memory device, such as DRAM, with emphasis on power management. A 3DS memory stack has built-in differential memory buffers. Each device (memory chip) in the stack acts as a device on a different channel, permitting higher memory bandwidth with a lower footprint as compared to conventional 3DS DRAM stacks because data buffers can be connected (re-configured) in case one data buffer fails, such that data can still be accessed.

Some embodiments of the present invention may not have the potential advantages herein disclosed, and these potential advantages are not necessarily required of all embodiments.

Figure 8:
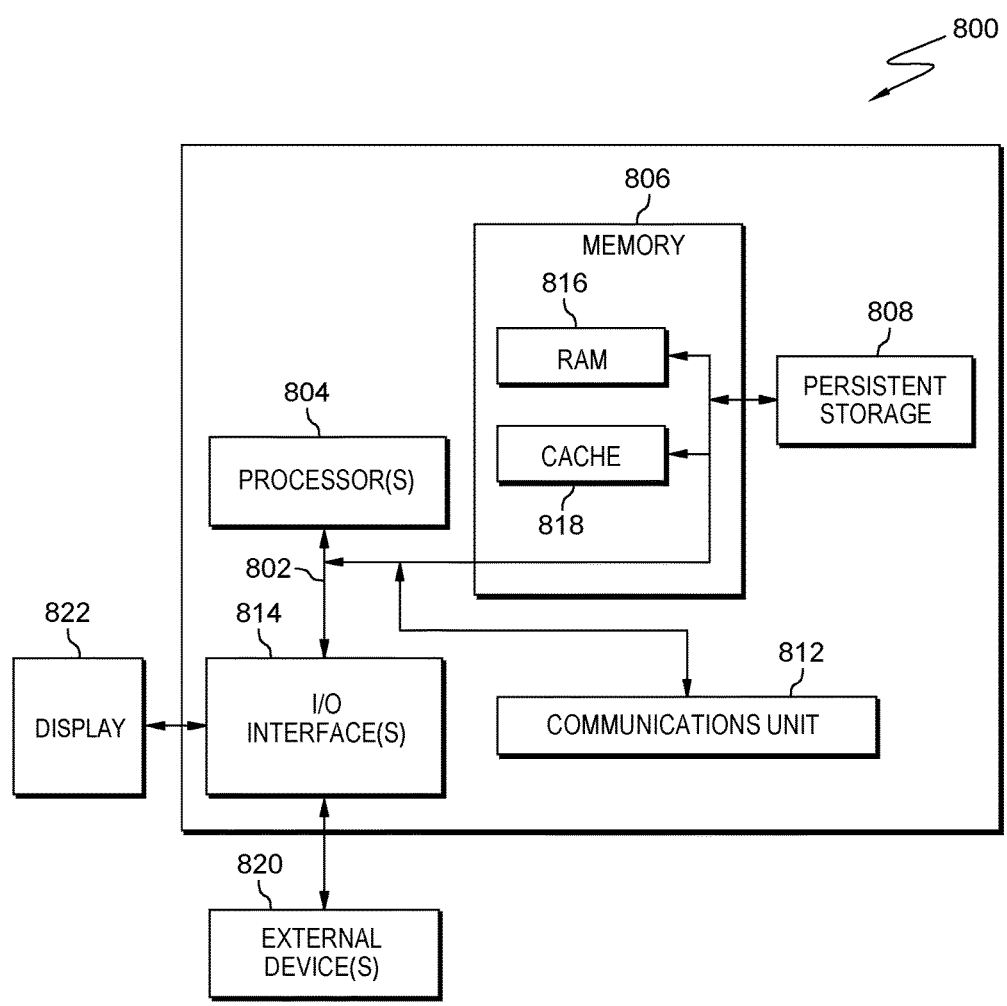
FIG. 8 is a block diagram depicting components of a computer, in accordance with at least one embodiment of the present invention.

FIG. 8 depicts a block diagram of components of computer 800 in accordance with an illustrative embodiment of the present invention. It should be appreciated that FIG. 8 provides only an illustration of one implementation and does not imply any limitations with regard to the environments in which different embodiments may be implemented. Many modifications to the depicted environment may be made.

As depicted, the computer 800 includes communications fabric 802, which provides communications between computer processor(s) 804, memory 806, persistent storage 808, communications unit 812, and input/output (I/O) interface(s) 814. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In this embodiment, memory 806 includes random access memory (RAM) 816 and cache memory 818. In general, memory 806 can include any suitable volatile or non-volatile computer-readable storage media.

One or more programs may be stored in persistent storage 808 for access and/or execution by one or more of the respective computer processors 804 via one or more memories of memory 806. In this embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer-readable storage medium that is also part of persistent storage 808.

Communications unit 812, in these examples, provides for communications with other data processing systems or devices. In these examples, communications unit 812 includes one or more network interface cards. Communications unit 812 may provide communications through the use of either or both physical and wireless communications links.

I/O interface(s) 814 allows for input and output of data with other devices that may be connected to computer 800. For example, I/O interface 814 may provide a connection to external devices 820 such as a keyboard, keypad, a touch screen, and/or some other suitable input device. External devices 820 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 808 via I/O interface(s) 814. I/O interface(s) 814 also connect to a display 822.

Display 822 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to optimal explain the principles of the embodiment, the practical application or technical improvement over technologies found in the marketplace, or to enable others of ordinary skill in the art to understand the embodiments disclosed herein.

DEFINITIONS

Some helpful default definitions follow.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Electrically Connected: means either directly electrically connected, or indirectly electrically connected, such that intervening elements are present; an electrical connection may include, but need not be limited to, elements such as capacitors, inductors, transformers, vacuum tubes, and the like.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer implemented method comprising:
receiving a signal, from a requester, commanding shutdown of a first interface of a three-dimensional stacked (3DS) memory module, where the 3DS memory module comprises a data input/output (I/O) chip physically integrated in the 3DS memory module, and the data I/O chip comprises a first data buffer corresponding to the first interface, and a second data buffer corresponding to a second interface;
assigning a primary data buffer role to the second data buffer;
routing subsequent buffer commands to the second data buffer; and
shutting down the first interface;
wherein:
the 3DS memory module further comprises: (i) a plurality of integrated circuit (IC) memory chips, including a first IC memory chip and a second IC memory chip, arranged in a three-dimensional stacked (3DS) configuration, and (ii) the data I/O chip;
the 3DS memory module is mounted in a dual inline memory module;

the first data buffer is coupled in data communication with the first IC memory chip and the second IC memory chip; and the second data buffer is coupled in data communication with the first IC memory chip and the second IC memory chip.

2. The method of claim 1, further comprising:

receiving a signal, from the requester, commanding re-activation of the first interface;

initiating a startup procedure to re-activate the first interface;

completing the startup procedure;

responsive to completing the startup procedure, sending a startup procedure completed signal to the requester; and routing at least some subsequent buffer commands to the first data buffer.

3. The method of claim 1, wherein the first interface and the second interface are respectively a first differential memory interface and a second differential memory interface.

4. The method of claim 1, wherein the first interface and the second interface are respectively a first double data rate memory interface (first DDR interface) and a second double data rate memory interface (second DDR interface).

5. The method of claim 1, wherein the requester is a memory controller.

6. A computer program product comprising a computer readable storage medium having stored thereon program instructions programmed to perform:

receiving a signal, from a requester, commanding shutdown of a first interface of a three-dimensional stacked (3DS) memory module, where the 3DS memory module comprises a data input/output (I/O) chip physically integrated in the 3DS memory module, and the data I/O chip comprises a first data buffer corresponding to the first interface, and a second data buffer corresponding to a second interface;

assigning a primary data buffer role to the second data buffer;

routing subsequent buffer commands to the second data buffer; and shutting down the first interface;

wherein:

the 3DS memory module further comprises: (i) a plurality of integrated circuit (IC) memory chips, including a first IC memory chip and a second IC memory chip, arranged in a three-dimensional stacked (3DS) configuration, and (ii) the data I/O chip;

the 3DS memory module is mounted in a dual inline memory module;

the first data buffer is coupled in data communication with the first IC memory chip and the second IC memory chip; and the second data buffer is coupled in data communication with the first IC memory chip and the second IC memory chip.

7. The computer program product of claim 6, further comprising program instructions programmed to perform:

receiving a signal, from the requester, commanding re-activation of the first interface;

initiating a startup procedure to re-activate the first interface;

completing the startup procedure;

responsive to completing the startup procedure, sending a startup procedure completed signal to the requester; and routing at least some subsequent buffer commands to the first data buffer.

8. The computer program product of claim 6, wherein the first interface and the second interface are respectively a first differential memory interface and a second differential memory interface.

9. The computer program product of claim 6, wherein the first interface and the second interface are respectively a first double data rate memory interface (first DDR interface) and a second double data rate memory interface (second DDR interface).

10. The computer program product of claim 6, wherein:

the computer program product is a computer system; and the computer program product further comprises a processor(s) set structured and/or connected in data communication with the storage medium such that the processor(s) set executes computer instructions stored on the storage medium.

11. The computer program product of claim 6, wherein the requester is a memory controller.

12. A three-dimensional stacked (3DS) memory module comprising:

a plurality of integrated circuit (IC) memory chips, including a first IC memory chip and a second IC memory chip, arranged in a three-dimensional stacked (3D S) configuration;

a data input/output (I/O) chip electrically connected to the plurality of memory devices and physically integrated in the 3DS configuration, where the data I/O chip comprises a first data buffer corresponding to a first interface, and a second data buffer corresponding to a second interface;

wherein the data I/O chip is configured to perform:

receiving a signal, from a requester, commanding shutdown of the first interface;

assigning a primary data buffer role to the second data buffer;

routing subsequent buffer commands to the second data buffer; and shutting down the first interface;

wherein:

the 3DS memory module further comprises the data I/O chip;

the 3DS memory module is mounted in a dual inline memory module;

the first data buffer is coupled in data communication with the first IC memory chip and the second IC memory chip; and the second data buffer is coupled in data communication with the first IC memory chip and the second IC memory chip.

13. The 3DS memory module of claim 12, wherein the data I/O chip is further configured to perform:

receiving a signal, from the requester, commanding re-activation of the first interface;

initiating a startup procedure to re-activate the first interface;

completing the startup procedure;

responsive to completing the startup procedure, sending a startup procedure completed signal to the requester; and routing at least some subsequent buffer commands to the first data buffer.

14. The 3DS memory module of claim 12, wherein the first interface and the second interface are respectively a first differential memory interface and a second differential memory interface.

15. The 3DS memory module of claim 12, wherein the first interface and the second interface are respectively a first double data rate memory interface (first DDR interface) and a second double data rate memory interface (first DDR interface).

16. The 3DS memory module of claim 12, wherein the requester is a memory controller.

* * * * *